(12) United States Patent
Ishida et al.

(10) Patent No.: US 6,372,279 B1
(45) Date of Patent: Apr. 16, 2002

(54) SWEETENER COMPOSITION

(75) Inventors: Hirotoshi Ishida; Akihiro Kishishita; Takeshi Nagai; Kazutaka Nagashima; Atsuhiko Hirano, all of Kawasaki (JP)

(73) Assignee: Ajinomoto Co., Inc., Toyko (JP)

( * ) Notice: Subject to any disclaimer, the term of this patent is extended or adjusted under 35 U.S.C. 154(b) by 0 days.

(21) Appl. No.: 09/707,954

(22) Filed: Nov. 8, 2000

Related U.S. Application Data

(63) Continuation of application No. PCT/JP99/02197, filed on Apr. 26, 1999.

(30) Foreign Application Priority Data

May 8, 1998 (JP) ............................................. 10-125990

(51) Int. Cl.$^7$ ............................................... A23L 1/236
(52) U.S. Cl. ......................... 426/548; 426/590; 560/40
(58) Field of Search ................................ 426/548, 590; 560/39, 40, 41

(56) References Cited

U.S. PATENT DOCUMENTS

| 5,480,668 | A | * | 1/1996 | Nofre et al. ................. 426/548 |
| 6,048,999 | A | * | 4/2000 | Pajor et al. .................... 560/39 |

FOREIGN PATENT DOCUMENTS

| JP | 8-503206 | 4/1996 |
| JP | 10-248521 | 9/1998 |

* cited by examiner

Primary Examiner—Leslie Wong
(74) Attorney, Agent, or Firm—Oblon, Spivak, McClelland, Maier & Neustadt, P.C.

(57) ABSTRACT

One embodiment of the present invention provides a sweetener composition, which includes a mixture of N-{N-(3,3-dimethylbutyl)-L-α-aspartyl}-L-phenylalanine 1-methyl ester, and Acesulfame K, wherein a ratio of the Acesulfame K to a total amount of the N-{N-(3,3-dimethylbutyl)-L-α-aspartyl}-L-phenylalanine 1-methyl ester and the Acesulfame K is in the range of 10 to 97% by weight, methods of making and of using. Another embodiment of the present invention provides a method for preparing a sweetener composition, which includes drying an A-type crystal of N-{N-(3,3-dimethylbutyl)-L-α-aspartyl}-L-phenylalanine 1-methyl ester to obtain a C-type crystal of N-{N-(3,3-dimethylbutyl)-L-α-aspartyl}-L-phenylalanine 1-methyl ester. Another embodiment of the present invention provides a method for producing a sweetener, which includes admixing N-{N-(3,3-dimethylbutyl)-L-α-aspartyl}-L-phenylalanine 1-methyl ester with Acesulfame K, wherein a ratio of the Acesulfame K to a total amount of the N-{N-(3,3-dimethylbutyl)-L-α-aspartyl}-L-phenylalanine 1-methyl ester and the Acesulfame K is in the range of 10 to 97% by weight. Another embodiment of the present invention provides a method for improving the dissolution rate of N-{N-(3,3-dimethylbutyl)-L-α-aspartyl}-L-phenylalanine 1-methyl ester, which includes, prior to dissolving the N-{N-(3,3 -dimethylbutyl)-L-α-aspartyl}-L-phenylalanine 1-methyl ester, admixing the N-{N-(3,3-dimethylbutyl)-L-α-aspartyl}-L-phenylalanine 1-methyl ester with Acesulfame K, wherein a ratio of the Acesulfame K to a total amount of the N-{N-(3,3-dimethylbutyl)-L-α-aspartyl}-L-phenylalanine 1-methyl ester and the Acesulfame K is in the range of 10 to 97% by weight.

17 Claims, 2 Drawing Sheets

SWEETENER COMPOSITION

This application is continuation of PCT/JP99/02197, which was filed on Apr. 26, 1999.

BACKGROUND OF THE INVENTION

1. Field of the Invention

The present invention relates to a sweetener composition having excellent solubility, which includes N-{N-(3,3-dimethylbutyl)-L-α-aspartyl}-L-phenylalanine 1-methyl ester (Neotame, abbreviated hereinafter to "NM") and Acesulfame K (abbreviated hereinafter to "ACE-K") as active ingredients.

2. Discussion of the Background

It is reported that the sweetness strength or sweetening potency of the synthetic high-potency sweetener, NM, is about 10,000 times that of sucrose in terms of weight ratio (Japanese Patent Kohyou Publication JP-A-8-503206). The properties of sweetness quality for NM are not reported in detail, but the present inventors have found that such a compound has an extremely weak early taste (i.e., wherein the sweetener, when put in the mouth, tastes sweet as early as sucrose), and is extremely strong in later taste (i.e., wherein the sweetener tastes sweet later than sucrose). Further, NM has a strong astringent taste. Accordingly, the balance of the quality of sweetness properties for NM is poor when compared to sucrose. Sucrose is generally regarded as the standard for evaluating the properties or characteristics of the quality of sweetness.

ACE-K is a synthetic sweetener, which is similar to Aspartame (abbreviated to "APM"). ACE-K has a sweetness or sweetening potency of about 200 times as high as sucrose in terms of weight ratio, but ACE-K is inferior to APM in terms of quality of sweetness because of ACE-K's strong early taste, bitter taste, astringent taste, peculiar taste and stimuli. Various improvements for ACE-K have been proposed, including improving its quality of sweetness by using it in combination with APM (U.S. Pat. No. 4,158,068 and its corresponding Japanese Patent Kokoku Publication JP-B-5951262 etc.). In this connection, the sweetness properties or the quality of sweetness for APM are that its early taste is weak and its later taste is strong as compared to sucrose.

Various proposals have been made for improving the quality of the sweetness of NM and ACE-K, thus achieving considerable effects. However, NM has poor solubility characteristics, i.e., industrially produced NM powder (crystal) has poor dissolution characteristics (solubility) in water, i.e., it is not readily dissolved due to its easy formation of agglomerates, or otherwise its dissolution rate is low, etc. Such poor dissolution characteristics, which may result from the formation of agglomerates, or the like is significantly disadvantageous to industrial production, since the production yield of foods and drinks such as soft drinks that contain NM to confer sweetness is thereby reduced.

SUMMARY OF THE INVENTION

Accordingly, one object of the present invention is thus to improve the dissolution characteristics of NM.

The present inventors have unexpectedly found that NM, when mixed with ACE-K, is prevented from forming agglomerates when dissolved, and further that the dissolution rate of this mixture is higher than that of NM alone, i.e., the dissolution rate (solubility) in general is improved.

Accordingly, one embodiment of the present invention provides a sweetener composition, which includes:

a mixture of N-{N-(3,3-dimethylbutyl)-L-α-aspartyl}-L-phenylalanine 1-methyl ester; and Acesulfame K, wherein a ratio of the Acesulfame K to a total amount of the N-{N-(3,3-dimethylbutyl)-L-α-aspartyl}-L-phenylalanine 1-methyl ester and the Acesulfame K is in the range of 10 to 97% by weight.

Another embodiment of the present invention provides a drink composition, which includes:

a mixture of N-{N-(3,3-dimethylbutyl)-L-α-aspartyl}-L-phenylalanine 1-methyl ester;

Acesulfame K; and a potable liquid, wherein a ratio of the Acesulfame K to a total amount of the N-{N-(3,3-dimethylbutyl)-L-α-aspartyl}-L-phenylalanine 1-methyl ester and the Acesulfame K is in the range of 10 to 97% by weight.

Another embodiment of the present invention provides a method for preparing a sweetener composition, which includes:

drying an A-type crystal of N-{N-(3,3-dimethylbutyl)-L-α-aspartyl}-L-phenylalanine 1-methyl ester to obtain a C-type crystal of N-{N-(3,3-dimethylbutyl)-L-α-aspartyl}-L-phenylalanine 1-methyl ester.

Another embodiment of the present invention provides a method for producing a sweetener, which includes:

admixing N-{N-(3,3-dimethylbutyl)-L-α-aspartyl}-L-phenylalanine 1-methyl ester with Acesulfame K, wherein a ratio of the Acesulfame K to a total amount of the N-{N-(3,3-dimethylbutyl)-L-α-aspartyl}-L-phenylalanine 1-methyl ester and the Acesulfame K is in the range of 10 to 97% by weight.

Another embodiment of the present invention provides a method for improving the dissolution rate of N-{N-(3,3-dimethylbutyl)-L-α-aspartyl}-L-phenylalanine 1-methyl ester, which includes, prior to dissolving the N-{N-(3,3-dimethylbutyl)-L-α-aspartyl}-L-phenylalanine 1-methyl ester, admixing the N-{N-(3,3-dimethylbutyl)-L-α-aspartyl}-L-phenylalanine 1-methyl ester with Acesulfame K, wherein a ratio of the Acesulfame K to a total amount of the N-{N-(3,3-dimethylbutyl)-L-α-aspartyl}-L-phenylalanine 1-methyl ester and the Acesulfame K is in the range of 10 to 97% by weight.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Various other objects, features and attendant advantages of the present invention will be more fully appreciated as the same becomes better understood from the following detailed description of the preferred embodiments of the invention.

Preferably, the NM is in the form of a powder or crystals in the mixture. Likewise, the ACE-K is preferably in the form of a powder or crystals in the mixture. Preferably, the mixture itself is in the form of a powder or crystals. Most preferably, the powder and/or crystals is a dry, free-flowing powder or crystals.

The crystalline form of powdery NM that is one of the active ingredients in the sweetener composition of the present invention is not particularly limited, and it may be either the known crystals (which may also be called "A-type crystals") or the "C-type crystals" described below. The C-type is significantly superior to the former and is thus most preferred.

In an additional remark, the crystal structure of known NM as disclosed in WO95/30689, the entire contents of which are hereby incorporated by reference, is described as IR spectrum data therein. Further, the present inventors analyzed the structure of its single crystal, and as a result, they confirmed that this crystal is a monohydrate, and, when measured by powder X-ray diffractometry, the crystal shows characteristic peaks in the X-ray diffraction pattern at diffraction angles of at least 6.0°, 24.8°, 8.2°, and 16.5° (2θ, CuKα radiation). For the sake of convenience, the present inventors refer to this crystal as "A-type crystal". See, e.g., FIG. 1, which shows a powder X-ray diffraction pattern of A-type crystals.

The present inventors have also found that the water content of dry A-type crystal is usually in the range of 3 to 6% by weight (including crystal water). The present inventors have also found that if this A-type crystal is further dried until its water content is reduced to less than 3%, a novel crystal of N-(3,3-dimethylbutyl)-APM is obtained with improved dissolution characteristics in which crystal water has been eliminated, and this novel crystal is referred to as the "C-type crystal".

Thus, a preferred embodiment of the present invention provides a novel form of N-{N-(3,3-dimethylbutyl)-L-α-aspartyl}-L-phenylalanine 1-methyl ester, which is referred to herein as the "C-type crystal", methods of making, and methods of use.

When measured by powder X-ray diffractometry using CuKα radiation, this C-type crystal shows characteristic peaks in the X-ray diffraction pattern at diffraction angles different from those of the A-type crystal, that is, at diffraction angles (2θ) of at least 7.1°, 19.8°, 17.3°, and 17.7°. See, e.g., FIG. 2, which shows a powder X-ray diffraction pattern of C-type crystals. Reference is also made to Reference Examples 1 to 3 below.

The mixing ratio of NM and ACE-K used in the sweetener composition of the present invention is preferably in the range of 10 to 97% by weight in terms of the ratio of ACE-K to a combined amount of both NM and ACE-K. If the ratio of ACE-K used therein is 10% by weight or less, and 97% by weight or more, the effect of ACE-K on the promotion of dissolution is decreased. More preferably, the mixing ratio ranges from 20 to 97%, more particularly preferably, the mixing ratio is 50 to 97%, more particularly preferably 55 to 95%, most preferably 60 to 90%, and most particularly preferably 75 to 85%. These ranges include all values and subranges therebetween, including 12%, 18%, 22%, 35%, 45%, 58% and 91%.

Also in the mixture of NM and ACE-K at these ratios, the effect of ACE-K on the promotion of NM dissolution may be varied depending on the crystal type of NM. If the crystalline form of NM is C-type crystal and the ratio of ACE-K to the total amount of NM and ACE-K is 50 to 97% by weight, the dissolution rate (solubility) of NM is particularly improved.

If NM and ACE-K are separately and at the same time added to water, i.e., separate but simultaneous addition, without being previously mixed, preferably at the predetermined ratio, the dissolution rate of ACE-K is large (high), and, accordingly, it is dissolved rapidly, but because the dissolution rate of NM is rate-determining (rate controlling), the dissolution rate as a whole is lower than that of their mixture because of the lower dissolution rate of NM. See, e.g., Experimental Example 3 below.

For the purpose of easy application or improvement in quality of sweetness, the sweetener composition of the present invention, similar to the case of conventional high-potency sweetener compositions, can incorporate diluents (thinners) and excipients such as sugar alcohols, oligosaccharide, food fibers (dietary fibers) and the like, or other synthetic high-potency sweeteners such as Aspartame, Alitame, saccharin etc. as necessary in an amount within such a range as not to spoil the NM dissolution characteristics improved by the present invention. The diluents and excipients in this case include low-potency sweeteners such as sucrose, glucose or the like. Mixtures are also possible.

The present invention not only can realize further improvements in the dissolution rate of NM but also can produce an excellent sweetener composition having quality of sweetness improved for both of NM and ACE-K.

The sweetener composition according to the present invention is particularly suitable for use in food and drink compositions for human and animal consumption. Preferred examples include without limitations beverages, table-top sweeteners, sweetener packets, candies, ice cream, coffee, tea, cereal, liquid sweeteners, low-calorie sweeteners, gelatin desserts, bread, cookies, fruit flavored beverages, cake mixes, fruit juices, syrups, salad dressings, pet foods, carbonated and non-carbonated soft drinks, foodstuffs, and the like. The composition of the present invention is also suitable for other applications such as cough medicines, cough drops and tonics. The composition of the present invention may be suitably mixed with a diluent or solvent including aqueous-based, alcohol-based, mixed aqueous/alcohol-based, water, propylene glycol, a water/propylene glycol mixture, ethanol or a water/ethanol mixture. Preferably, the sweetener composition of the present invention may be used alone or will make up anywhere from 0.1% to greater than 99% by weight of the food or drink composition, more preferably 1–95%, more particularly preferably 2–90%, more especially preferably 5–85%, most preferably 10–75%, most particularly preferably 20–65%, and most especially preferably 30–55% by weight, based on the total weight of the food or drink composition. These ranges include all values and subranges therebetween, including 4%, 14%, 22%, 43%, 49%, 82% and 91%.

EXAMPLES

Having generally described this invention, a further understanding can be obtained by reference to certain specific examples which are provided herein for purposes of illustration only and are not intended to be limiting unless otherwise specified. The amounts are given as percentages by weight, except where otherwise mentioned.

Reference Example 1

Preparation of NM

The followings were introduced successively under stirring to a reactor equipped with an agitating blade for ensuring very efficient transfer of gaseous hydrogen to a liquid layer (solution). That is, 700 ml of ion exchanged water, 4.21 ml of acetic acid, 20 g of 10% palladium carbon, 1,300 ml of methanol, 56 g of Aspartame and 25 ml of 3,3-dimethylbutylaldehyde were introduced thereto.

The reactor was filled with a nitrogen gas stream, and then the reaction mixture was hydrogenated at a $H_2$ gas flow rate of 200 ml/min. at room temperature. The progress of this reaction was monitored by sampling the reaction mixture and analyzing the product in high performance liquid chromatography (HPLC). After the hydrogenation reaction for 6 hours, this reaction was terminated by filling the reactor with a nitrogen gas and filtering the reaction mixture through a fine pore filter (0.45 μm) to remove the catalyst.

As a result of the analysis of the resulting filtrate (1,494 g), the yield was 81. Subsequently, this filtrate was concentrated to 281 g to remove the methanol, and crystals were precipitated under stirring at 10° C. overnight. Finally, 87 g white wet crystals of NM (yield: 77%) were obtained at a high purity (99% or more, HPLC).

Reference Example 2
Production of A-type Crystals

Part of NM prepared in Reference Example 1 was used to prepare 100 g aqueous solution of NM at a concentration of 3% by weight (dissolved at 60° C.). Then, the solution was cooled from 60° C. to 30° C. for 5 minutes under stirring. When the liquid temperature was reached to 30° C., crystallization of white crystals was initiated. After overnight aging under the temperature kept at 30° C. for the liquid, the crystals were collected on a filter paper.

Figure 1:
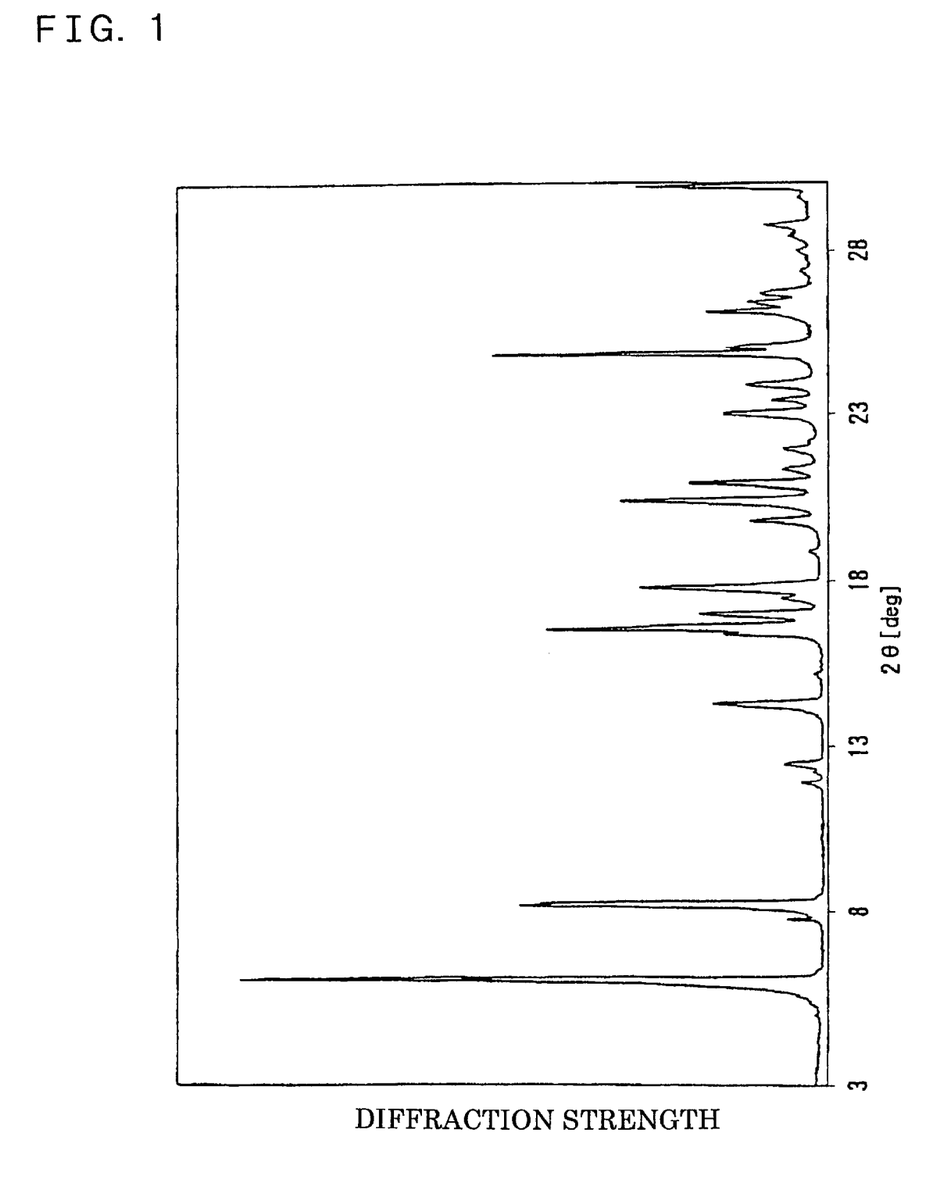
FIG. 1: A powder X-ray diffraction pattern of A-type crystals.

(a) The diffractive X-ray (X-ray diffraction pattern) of the wet crystals obtained above was measured by powder X-ray diffractometry using CuKα radiation. The obtained powder X-ray diffraction pattern is shown in FIG. 1.

As is evident from the pattern of the figure, the wet crystals showed characteristic diffraction peaks at least 6.0° 24.8°, 8.2° and 16.5°, and they were A-type crystals.

Further, (b) the wet crystals were placed in a vacuum dryer set at 50° C., and dried until their water content was reduced to 5% by weight. The dried crystals thus obtained were measured by powder X-ray diffractometry using CuKα radiation, indicating that the crystals were A-type crystals as well.

Further, as a result of IR spectrum (KBr) measurement, its values agreed with those described in WO95/30689, the entire contents of which being hereby incorporated by reference, the same as if set forth at length.

Reference Example 3
Production of C-type Crystals

The dried A-type crystals with a water content of 5% by weight described above were continued to be dried in the vacuum dryer until their water content was reduced to 0.8% by weight.

Figure 2:
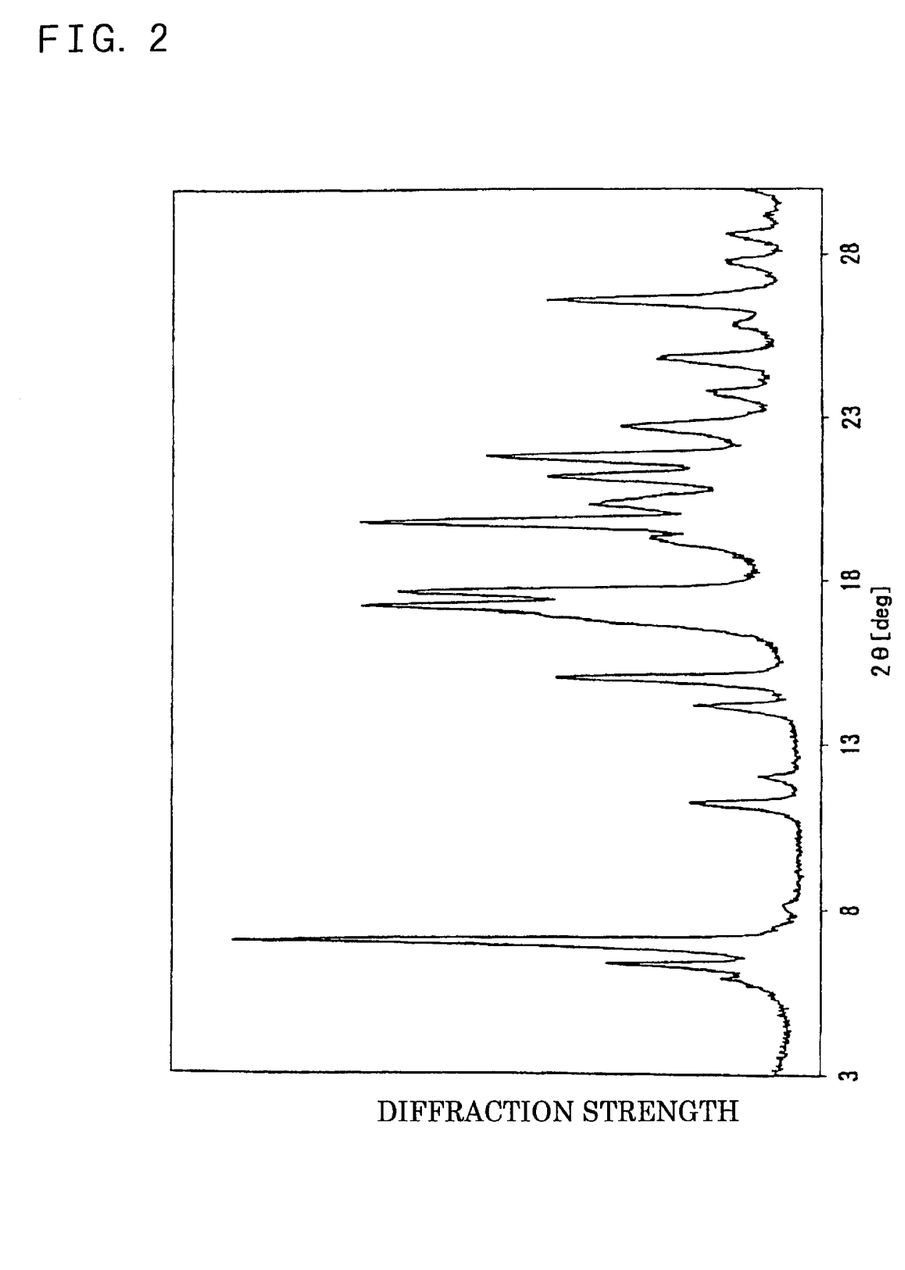
FIG. 2: A powder X-ray diffraction pattern of C-type crystals.

The X-ray diffraction pattern of the dried crystals was measured by powder X-ray diffractometry using CuKα radiation. The thus obtained powder X-ray diffraction pattern is shown in FIG. 2.

As is evident from the pattern of the figure, the dried crystals showed characteristic diffraction peaks at least at 7.1°, 19.8°, 17.3°, and 17.7°. As described above, the crystals are C-type crystals.

Experimental Example 1
(Dissolution Rate of a Mixture of NM C-type Crystals and ACE-K Powder)

A predetermined amount of the sample was introduced into 900 ml water (20° C.) in a 1-L elution tester (the Japanese Pharmacopoeia, Paddle method, 100 rpm) and its dissolution time was measured (end point was visually confirmed).

Specifically, 1 g of the sample taken from each mixture consisting of NM C-type crystals (average particle size (diameter) of about 100 μm) and ACE-K raw powder (average particle size of about 20 μm) at a predetermined ratio (ACE-K content (% by weight)) shown in Table 1 below, was weighed and measured for its dissolution time. For comparison, 1.00 g, 0.90 g, 0.80 g, 0.50 g, 0.10 g, and 0.03 g samples were taken from said NM crystals and their dissolution times were determined in the same manner.

The time (min.) needed for the dissolution of each sample is shown together in Table 1 below.

TABLE 1

Dissolution times of NM C-type crystal/ACE-K powder mixtures

NM C-type crystals alone

| Amount of NM C-type crystals (g) | Dissolution time (min) |
|---|---|
| 1.00 | 62 |
| 0.90 | 60 |
| 0.80 | 58 |
| 0.50 | 55 |
| 0.10 | 40 |
| 0.03 | 30 |

Mixture (1 g)

| Content of ACE-K powder (% by weight) | Amount of NM C-type crystals (g) | Dissolution time (min) |
|---|---|---|
| 10 | 0.90 | 50 |
| 20 | 0.80 | 38 |
| 50 | 0.50 | 4 |
| 90 | 0.10 | 3 |
| 97 | 0.03 | 3 |

As can be seen from this table, the dissolution rate (solubility) of the NM C-type crystals is remarkably and significantly improved in the form of the mixture (sweetener composition of the present invention), as compared with that of the NM C-type crystals alone.

As described above, the sweetness potencies (degree of sweetness) of NM and ACE-K are about 10,000 and about 200 times that of sucrose. From this viewpoint, the dissolution time of 1 g mixture should be compared with the dissolution time of an amount of NM necessary to achieve the same of sweetness, but even in such comparison, there is the promoting action of ACE-K on the dissolution of NM, for example, as follows. That is, the sweetness of 1 g mixture containing 50% ACE-K powder is equal to the sweetness of 0.51 g of NM alone, and the dissolution time of the former is 4 minutes, while the dissolution time of the latter is about 60 minutes, so there is a significant difference therebetween.

Experimental Example 2
(Dissolution Rate of a Mixture of NM A-type Crystals and ACE-K Powder)

The dissolution times of mixtures of NM and ACE-K were measured in the same manner as in Experimental Example 1 except that NM A-type crystals were used in place of NM C-type crystals.

The sample amount for each mixture and the amount of NM alone (NM A-type crystals) were the same as that in Example 1.

The dissolution time (min) needed for each sample is shown in Table 2.

TABLE 2

Dissolution times of NM A-type crystal/ACE-K powder mixtures

NM A-type crystals alone

| Amount of NM A-type crystals (g) | Dissolution time (min) |
|---|---|
| 1.00 | 42 |
| 0.90 | 40 |
| 0.80 | 38 |
| 0.50 | 35 |
| 0.10 | 16 |
| 0.03 | 10 |

Mixture (1 g)

| Content of ACE-K powder (% by weight) | Amount of NM A-type crystals (g) | Dissolution time (min) |
|---|---|---|
| 10 | 0.90 | 25 |
| 20 | 0.80 | 20 |
| 50 | 0.50 | 13 |
| 90 | 0.10 | 10 |
| 97 | 0.03 | 6 |

As may be seen from the above Table and from the comparison of the Table 2 with the Table 1, the dissolution rate of NM is improved more significantly by using C-type crystals rather than A-type crystals.

Experimental Example 3
(Separate Addition of NM C-type Crystals Alone and ACE-K Powder)

The same NM crystals as those in Experimental Example 1 were used as NM, and the same ACE-K powder (average particle size (diameter) of about 20 μm) as that in Experimental Example 1 was used as ACE-K, and the dissolution times thereof were determined in the same manner as in Experimental Example 1.

That is, 0.5 g each of both of them was weighed (1.0 g in total) and introduced simultaneously without being previously mixed, into the elution tester (separate addition). The results are shown in Table 3 below. For reference, the dissolution time of 0.5 g NM C-type crystals alone (Experimental Example 1) is also shown together in the table.

TABLE 3

Dissolution time of NM and ACE-K when separately added (min)

| NM C-type crystals alone (0.5 g) | Separate addition (1 g in total) (0.5 g NM C-type crystals + 0.5 g ACE-K powder) |
|---|---|
| 55 minutes | 55 minutes |

From this table, the improvement of NM dissolution rate (solubility) by using ACE-K is not observed when NM and ACE-K are separately added without being previously mixed. This may be attributable to the very high dissolution rate of ACE-K, as described above.

According to the present invention, Acesulfame K (ACE-K) powder is mixed with Neotame (NM) whereby the poor dissolution characteristics (solubility) of NM can be significantly improved, and simultaneously a sweetener excellent in quality of sweetness can be easily obtained. Accordingly, the present invention is advantageous particularly for use in drinks where a sweetener is dissolved in industrial production, but the present invention is not limited thereto and can be used as an improved sweetener composition in any uses.

Having now fully described this invention, it will be apparent to one of ordinary skill in the art that many changes and modifications can be made thereto without departing from the spirit or scope of the invention as set forth herein.

This application is based on International Application No. PCT/JP99/02197, filed Apr. 26, 1999, and Japanese Patent Application No. 10-125990, filed May 8, 1998, the entire contents of each of which being hereby incorporated by reference, the same as if set forth at length.

We claim:

1. A sweetener composition, comprising a mixture of:
   (a) N-[N-(3,3-dimethylbutyl)-L-α-aspartyl]-L-phenylalanine 1-methyl ester; and
   (b) Acesulfame K,
   wherein said Acesulfame K is present in said mixture in an amount of 50 to 97% by weight based on the total weight of said N-[N-(3,3-dimethylbutyl)-L-α-aspartyl]-L-phenylalanine 1-methyl ester and said Acesulfame K.

2. The sweetener composition of claim 1, wherein said N-[N-(3,3-dimethylbutyl)-L-α-aspartyl]-L-phenylalanine 1-methyl ester comprises a C-type crystal.

3. The sweetener composition of claim 1, wherein said N-[N-(3,3-dimethylbutyl)-L-α-aspartyl]-L-phenylalanine 1-methyl ester is a dry powder.

4. The sweetener composition of claim 1, wherein said Acesulfame K is a dry powder.

5. The sweetener composition of claim 1, which is in the form of a dry powder.

6. The sweetener composition of claim 1, wherein said N-[N-(3,3-dimethylbutyl)-L-α-aspartyl]-L-phenylalanine 1-methyl ester comprises a C-type crystal which exhibits CuKa (2Θ) X-ray diffraction peaks of at least 7.1°, 19.8°, 17.3°, and 17.7°.

7. The sweetener composition of claim 1, wherein said N-[N-(3,3-dimethylbutyl)-L-α-aspartyl]-L-phenylalanine 1-methyl ester comprises a C-type crystal having a water content of less than 3% by weight.

8. The sweetener composition of claim 1, wherein said N-[N-(3,3-dimethylbutyl)-L-α-aspartyl]-L-phenylalanine 1-methyl ester comprises an A-type crystal.

9. The sweetener composition of claim 1, wherein said N-[N-(3,3-dimethylbutyl)-L-α-aspartyl]-L-phenylalanine 1-methyl ester comprises an A-type crystal having a water content in the range of 3 to 6% by weight.

10. The sweetener composition of claim 1, wherein said N-[N-(3,3-dimethylbutyl)-L-α-aspartyl]-L-phenylalanine 1-methyl ester comprises an A-type crystal which exhibits CuKa (2Θ) X-ray diffraction peaks of at least 6.0°, 24.8°, 8.2°, and 16.5°.

11. The sweetener composition of claim 1, further comprising at least one ingredient selected from the group consisting of diluents, thinners, excipients, sugar alcohols, oligosaccharides, food fibers, dietary fibers, synthetic high-potency sweeteners, Aspartame, Alitame, saccharin, low-potency sweeteners, sucrose, glucose and mixtures thereof.

12. A drink composition, comprising:
   (A) a mixture, comprising:
      (a) N-[N-(3,3-dimethylbutyl)-L-α-aspartyl]-L-phenylalanine 1-methyl ester; and
      (b) Acesulfame K; and
   (B) a potable liquid,
   wherein said Acesulfame K is present in said mixture in an amount of 50 to 97% by weight based on the total weight of said N-[N-(3,3-dimethylbutyl)-L-α-aspartyl]-L-phenylalanine 1-methyl ester and said Acesulfame K.

13. A method for preparing a sweetener composition, comprising:
  (1) drying A-type crystals of N-[N-(3,3-dimethylbutyl)-L-α-aspartyl]-L-phenylalanine 1-methyl ester, to obtain C-type crystals of N-[N-(3,3-dimethylbutyl)-L-α-aspartyl]-L-phenylalanine 1-methyl ester; and
  (2) mixing said C-type crystals of N-[N-(3,3-dimethylbutyl)-L-α-aspartyl]-L-phenylalanine 1-methyl ester with Acesulfame K, to obtain a mixture,
  wherein said Acesulfame K is present in said mixture in an amount of 50 to 97% by weight based on the total weight of said N-[N-(3,3-dimethylbutyl)-L-α-aspartyl]-L-phenylalanine 1-methyl ester and said Acesulfame K.

14. A method for producing a sweetener, comprising:
  (1) mixing N-[N-(3,3-dimethylbutyl)-L-α-aspartyl]-L-phenylalanine 1-methyl ester with Acesulfame K, to obtain a mixture,
  wherein said Acesulfame K is present in said mixture in an amount of 50 to 97% by weight based on the total weight of said N-[N-(3,3-dimethylbutyl)-L-α-aspartyl]-L-phenylalanine 1-methyl ester and said Acesulfame K.

15. The method of claim 14, wherein said N-[N-(3,3-dimethylbutyl)-L-α-aspartyl]-L-phenylalanine 1-methyl ester comprises a C-type crystal having a water content of less than 3% by weight.

16. A method for improving the dissolution rate of N-[N-(3,3-dimethylbutyl)-L-α-aspartyl]-L-phenylalanine 1-methyl ester, comprising:
  (1) mixing said N-[N-(3,3-dimethylbutyl)-L-α-aspartyl]-L-phenylalanine 1-methyl ester with Acesulfame K, prior to dissolving said N-[N-(3,3-dimethylbutyl)-L-α-aspartyl]-L-phenylalanine 1-methyl ester, to obtain a mixture,
  wherein said Acesulfame K is present in said mixture in an amount of 50 to 97% by weight based on the total weight of said N-[N-(3,3-dimethylbutyl)-L-α-aspartyl]-L-phenylalanine 1-methyl ester and said Acesulfame K.

17. The method of claim 16, wherein said N-[N-(3,3-dimethylbutyl)-L-α-aspartyl]-L-phenylalanine 1-methyl ester comprises a C-type crystal having a water content of less than 3% by weight.

* * * * *

(12) EX PARTE REEXAMINATION CERTIFICATE (6248th)
United States Patent
Ishida et al.

(10) Number: US 6,372,279 C1
(45) Certificate Issued: Jun. 10, 2008

(54) SWEETENER COMPOSITION

(75) Inventors: Hirotoshi Ishida, Kawasaki (JP);
Akihiro Kishishita, Kawasaki (JP);
Takeshi Nagai, Kawasaki (JP);
Kazutaka Nagashima, Kawasaki (JP);
Atsuhiko Hirano, Kawasaki (JP)

(73) Assignee: Ajinomoto Co., Inc, Tokyo (JP)

Reexamination Request:
No. 90/007,160, Aug. 10, 2004

Reexamination Certificate for:
Patent No.: 6,372,279
Issued: Apr. 16, 2002
Appl. No.: 09/707,954
Filed: Nov. 8, 2000

Related U.S. Application Data (63) Continuation of application No. PCT/JP99/02197, filed on Apr. 26, 1999.

(30) Foreign Application Priority Data

May 8, 1998 (JP) .......................................... 10-125990

(51) Int. Cl.
*A23L 1/236* (2006.01)

(52) U.S. Cl. ........................ 426/548; 426/590; 560/40
(58) Field of Classification Search ...................... None
See application file for complete search history.

(56) References Cited

U.S. PATENT DOCUMENTS

| | | | |
|---|---|---|---|
| 2,803,551 A | 8/1957 | Helgren | |
| 3,653,923 A | 4/1972 | Ishii et al. | |
| 3,695,898 A | 10/1972 | Hill et al. | |
| 3,780,189 A | 12/1973 | Scott | |
| 4,001,455 A | 1/1977 | La Via et al. | |
| 4,085,232 A | 4/1978 | Eisenstadt | |
| 4,158,068 A | 6/1979 | Von Rymon Lipinski et al. | |
| 4,254,154 A | 3/1981 | Eisenstadt | |
| 4,495,170 A | 1/1985 | Beyts et al. | |
| 4,835,301 A * | 5/1989 | Wakamatsu et al. | 560/41 |
| 5,474,791 A | 12/1995 | Zablocki et al. | |
| 5,480,668 A * | 1/1996 | Nofre et al. | 426/548 |
| 5,510,508 A | 4/1996 | Claude et al. | |
| 5,728,862 A | 3/1998 | Prakash | |
| 6,048,999 A | 4/2000 | Pajor et al. | |
| 6,214,402 B1 | 4/2001 | Fotos et al. | |
| 6,372,278 B1 | 4/2002 | Ishida et al. | |
| 6,372,279 B1 | 4/2002 | Ishida et al. | |
| 6,432,464 B1 * | 8/2002 | Andersen et al. | 426/548 |
| 6,444,251 B1 | 9/2002 | Kishishita et al. | |
| 6,692,778 B2 | 2/2004 | Yatka et al. | |
| 2002/0037350 A1 * | 3/2002 | Ishii et al. | 426/548 |

FOREIGN PATENT DOCUMENTS

| | | |
|---|---|---|
| CA | 602572 | 8/1960 |
| EP | 0 139 430 | 9/1984 |
| FR | 2 697 844 | 11/1992 |
| JP | 47-23389 | 6/1972 |
| WO | WO 94/11391 | 5/1994 |
| WO | WO 99/30576 | 6/1999 |
| WO | WO 99/30577 | 6/1999 |
| WO | WO 99/62354 | 12/1999 |

OTHER PUBLICATIONS

Schiffman et al "Investigation of Synergism in Binary Mixtures of Sweeteners" Brain Research Bulletin (1995), vol. 38, pp. 105–120.*

Wells, A.G.. "The Use of Intense Sweeteners in Soft Drinks." 1989. *Progress in Sweeteners*. Ed. T.H. Grenby. Elsevier Applied Science; London and New York (p. 169–214).

Ager, David J. et al. "Commercial, Synthetic Nonnutritive Sweeteners." *Angewante Chemie International* Ed. 1998, vol. 37; No. 13/14, p. 1802–1917 (Germany).

Ayya, Nalini and Harry T. Lawless. "Quantitative and Quantative Evaluation of High–Intensity Sweeteners and Sweetener Mixtures." *Chemical Senses* 17: 245–259, 1992.

Bakal, Abraham I.. Ed. Lyn O'Brien Nabors and Robert C. Gelardi. "Mixed Sweetener Functionality." *Alternative Sweeteners*. 2nd ed. Marcel Dekker, NY., (1991) p. 381–399.

Pajor, Laurie, Allison Vevang, and Kernon Gibes. Study Protocols: *Ingestion of Sweetener Candidate NC–00723 in Food and Beverages*. In Memorandum to Ihab Bishay on Dec. 17, 1998.

(Continued)

*Primary Examiner*—Lien Tran (57) ABSTRACT

One embodiment of the present invention provides a sweetener composition, which includes a mxiture of N-{N-(3,3-dimethylbutyl)-L-α-aspartyl}-L-phenylalanine 1-methyl ester, and Acesulfame K, wherein a ratio of the Acesulfame K to a total amount of the N-{N-(3,3-dimethylbutyl)-L-α-aspartyl}-L-phenylalanine 1-methyl ester and the Acesulfame K is in the range of 10 to 97% by weight, methods of making and of using. Another embodiment of the present invention provides a method for preparing a sweetener composition, which includes drying an A-type crystal of N-{N-(3,3-dimethylbutyl)-L-α-aspartyl}-L-phenylalanine 1-methyl ester to obtain a C-type crystal of N-{N-(3,3-dimethylbutyl)-L-α-aspartyl}-L-phenylalanine 1-methyl ester. Another embodiment of the present invention provides a method for producing a sweetener, which includes admixing N-{N-(3,3-dimethylbutyl)-L-α-aspartyl}-L-phenylalanine 1-methyl ester with Acesulfame K, wherein a ratio of the Acesulfame K to a total amount of the N-{N-(3,3-dimethylbutyl)-L-α-aspartyl}-L-phenylalanine 1-methyl ester and the Acesulfame K is in the range of 10 to 97% by weight. Another embodiment of the present invention provides a method for improving the dissolution rate of N-{N-(3,3-dimethylbutyl)-L-α-aspartyl}-L-phenylalanine 1-methyl ester, which includes, prior to dissolving the N-{N-(3,3 -dimethylbutyl)-L-α-aspartyl}-L-phenylalanine 1-methyl ester, admixing the N-{N-(3,3-dimethylbutyl)-L-α-aspartyl}-L-phenylalanine 1-methyl ester with Acesulfame K, wherein a ratio of the Acesulfame K to a total amount of the N-{N-(3,3-dimethylbutyl)-L-α-aspartyl}-L-phenylalanine 1-methyl ester and the Acesulfame K is in the range of 10 to 97% by weight.

OTHER PUBLICATIONS

Third Declaration of D. Eric Walters. Interference No. 105,246 (RES). Apr. 7, 2005.

Deposition of Masato Kawauchi, Interference No. 105,246 (RES): Apr. 2, 2005.

Lawless, Harry T. and Hildegarde Heymann. "Overview of Sensory Principles and Practices." In *Sensory Evaluation of Food: Principles and Practices;* Aspen Publishers, Inc.: New York 1999, p. 623–646.

Bakal, Abraham I.. "Functionality of Combined Sweeteners in Several Food Applications." *Chemistry and Industry;* Sep. 19, 1983; p. 700–708 (London).

Berenbaum, M.C.. "What is Synergy?" *Pharmacological Reviews;* vol. 1989, No. 41; p. 93–141 (1990) USA.

Chung, Hai–Jung, 51, Food and Science Tech.. Abstract of "Measurement of Synergistic Effects of Binary Sweetener Mixtures." *Journal of Food Science and Nutrition;* 1997, 2 (4) 291–295.

Dong, Zedong et al.. "Crystal Structure and Physical Characterization of Neotame Methanol Solvate." *Journal of Chemical Crystallography;* vol. 29 No. 8, 1999, p. 967–975.

Dong, Zedong et al. "Crystal Structure of Neotame Anhydrate Polymorph G." *Pharmaceutical Research,* vol. 19, No. 10, Oct. 2002, 1549–1553.

Endicott, C. J. and H. M. Gross. "Artificial Sweetening of Tablets." *Drug and Cosmetic Industry;* (1959) p. 23–25.

Flamm, W. Gary et al. "Long–term Food Consumption and Body Weight Changes in Neotame Safety Studies are Consistent with the Allometric Relationship Observed for other Sweeteners and during Dietary Restrictions." *Regulatory Toxicology and Pharmacology;* 38 (2003) p. 144–156.

Frank, Robert A. et al. "An Assessment of Binary Mixture Interactions for Nine Sweeteners." *Chemical Senses;* vol. 14 No. 5 (1989) p. 621–632.

Fry, John. "Trends and Innovations in Low–Calorie Sweeteners." *The World of Ingredients;* p. 16–18 (Mar.–Apr. 1998).

Gelardi, Robert C. and Editor Neil H. Melmelstein. "The Multiple Sweetener Approach and New Sweeteners on the Horizon." *Food Technology;* Jan. 1987, p. 123–124.

Goodman, Murray et al. "X–Ray Structures of New Dipeptide Taste Ligands." *Journal of Peptide Science;* 4, p. 229–238 (1998).

Grossfeld, J. Abstract of "The Sweetening Power of Artificial Sweeteners." *Z. Ges. Kohlensaure Ind.;* No. 15,253 (1921).

Homler, Barry E. et al. "Aspartame." *Alternative Sweeteners,* 2nd Edition. Ed. Lyn O'Brien Nabors and Robert C. Gelardi. New York: Marcel Dekker, Inc. 1991. Chapter 4, p. 39–69.

Katritzky, Alan R. et al. "A QSPR Study of Sweetness Potency Using the CODESSA Program." *Croatica Chemica Acta.,* 75 (2), 475–502 (2002).

Mattern, Ralph–Heiko, et al. "Conformational Analysis of Potent Sweet Taste Ligands by Nuclear Magnetic Resonance, Computer Simulations and X–Ray Diffraction Studies." *Journal of Peptide Research;* 50 (1997) p. 286–299.

Mayhew, Dale A., et al. "Food Consumption and Body Weight Changes with Neotame, a New Sweetener with Intense Taste: Differentiating Effects of Palatability from Toxicity in Dietary Safety Studies." *Regulatory Toxicology and Pharmacology:* 38 (2003) p. 124–143.

Moncrieff, R. W. *The Chemical Senses.* New York: John Wiley and Sons, Inc. (1941) p. 106–107.

Moskowitz, Howard R., et al. "Sweetness and Acceptance Optimization in Cola Flavored Beverages using Combinations of Artificial Sweeteners—A Psychological Approach." *Journal of Food Quality;* 2 (1978) p. 17–26.

Moskowitz, Howard R. and Leon Klarman. "The Hedonic Tones of Artificial Sweeteners and their Mixtures." *Chemical Senses and Flavor;* 1 (1975) p. 423–429.

"Neotame—First Sightings." *The World of Ingredients* May–Jun. 1999, p. 62.

Nofre, Claude and Jean Marie Tinti. "Neotame: Discovery, Properties, Utility." *Food Chemistry* 69 (2000) p. 245–257.

Padden, Brian E., et al. "Comparison of Solid–State C NMR Spectroscopy and Power X–Ray Diffraction for Analyzing Mixtures of Polymorphs of Neotame." *Analytical Chemistry;* vol. 71 No. 16 (1999) p. 3325–3331.

Paul–München, Theodor. "Physikalische Chemie der Lebensmittel: V. der Süsssungsgrad der Süsstoffe." *Zeitschrift Für Elektrochemie;* 27 (1921) p. 539–546.

Prakash, Indra, et al. "Modifying the Temporal Profile of the High–Potency Sweetener Neotame." *Journal of Agricultural and Food Chemistry;* 49 (2001) p. 786–789.

Prakash, Indra, et al. "Neotame: The Next–Generation Sweetener." *Food Technology;* Jul. 2002, vol. 56, No. 7 p. 36–40 and 45.

Prakash, Indra, et al. "Neotame: Synthesis, Stereochemistry and Sweetness." *Synthetic Communications;* 29 (24) p. 4461–4467 (1999).

Byrne, Maureen. "Sweetener Blends." *Food Engineering International; Food Explorer* Nov. 2, 1998 http://www.foodexplorer.com/product/TECHTUT/F102740.htm p. 1–3.

Kim, S.H. and G.E. Dubois. "Natural High Potency Sweeteners." In *Handbook of Sweeteners,* Marie, S. and J.R. Piggot Eds.: Blackie and Son, Ltd.; Glasgow, 1991; p. 116–185.

Schiffman, S. S., et al. "Investigation of Synergism in Binary Mixtures of Sweeteners." *Brain Research Bulletin,* 38(2) (1995) p. 105–120.

Schiffman, S. S., et al. "Sensory Evaluation of Soft Drinks with Various Sweeteners." *Physiology and Behavior,* 34 (1984) p. 369–377.

Ueno Pharmaceutical Co. Ltd. Technical Dept. "A Novel Method for the Utilization of Artificial Sweeteners." *Shokuhin to Kagaku (Food Science),* vol. 6, No. 3 (1964) p. 39–43.

Stargel, W. Wayne, et al. "Neotame." in *Alternative Sweeteners.* ed. Nabors L.; Marcel Dekker, Inc.: New York, 2001; p. 129–144.

Tornout, Van, et al. "Sweetness Evaluation of Mixtures of Fructose with Saccharin, Aspartame, or Acesulfame K." *Journal of Food Science;* 50 (1985) p. 469–472.

Verdi, Robert J. and Larry L. Hood. "Advantages of Alternative Sweetener Blends." *Food Technology* Jun. 1993 47(6), p. 94–101.

Vincent, Hugh C., et al. "A Taste Panel Study of Cyclamate–Saccharin Mixture and of its Components." *Journal of the American Pharmaceutical Association* 44(7) Jul. 1955, p. 442–446.

Walters, Eric, et al. "Active Conformations of Neotame and other High–Potency Sweeteners." *Journal of Medicinal Chemistry;* 43(6) 2000, p. 1242–1245.

Walters, Eric Ed. "High–Intensity Sweetener Blends: Sweet Choices." *Food Product Design* 3(6) 1993, p. 83–92.

Wink, Donald J., et al. "Neotame, an Alkylated Dipeptide and High Intensity Sweetener." *Acta Crystallographica Section C Crystal Structure Communications,* 55(8) 1999, p. 1365–1368.

Yamane, Takeo, et al. Korin–Compendia, entry Kanmiryo (Sweeteners), 1966 p. 216–217, Korinshoin, Tokyo.

Schiffman, Susan S., et al. "Effect of Repeated Presentation on Sweetness Intensity of Binary and Ternary Mixtures of Sweeteners," *Chem. Senses* 28 (2003) 219–229.

DuBois, Grant E., et al. "Concentration–Response Relationships of Sweeteners." In *Sweeteners Discovery, Molecular Design, and Chemoreception* ed. D. Eric Walters, et al. American Chemical Society: Washington, DC (1991) p. 261–276.

Schifferstein, Hendrik N.J. "An Equiratio Mixture Model for Non–additive Components: A Case Study for Aspartame/ Acesulfame–K Mixtures." *Chemical Senses* 21(1) 1996 p. 1–11.

Lipinski, G. W. von Rymon. "The Blending of Sweeteners—Applications and Safety Issues." In *Advances in Sweeteners* Ed. T.H. Grenby, et al. Blackie A & P: London (1996) p. 263–272.

Institute of Food Safety and Nutrition. *Combined Actions and Interactions of Chemicals in Mixtures. The Toxicological Effects of Exposure to Mixtures of Industrial and Environmental Chemicals;* Danish Veterinary and Food Administration: Soborg, 2003, p. 1–158.

Hanger, L.Y., et al. "Descriptive Profiles of Selected High Intensity Sweeteners (HIS), HIS Blends, and Sucrose." *Journal of Food Science,* 61(2) 1996, p. 456–464.

Portmann, Marie–Odile and David Kilcast. "Descriptive Profiles of Synergistic Mixtures of Bulk and Intense Sweeteners." *Food Quality and Preference* 19(4) 1998, p. 221–229.

Dubois, Grant E. and Janice F. Lee. "A Simple Technique for the Evaluation of Temporal Taste Properties." *Chemical Senses,* 7(3/4) 1983, p. 237–247.

Noble, A.C., et al. "Factors Affecting the Time–Intensity Parameters of Sweetness: *Sweetener Identity and Concentration, Viscosity, Temperature, Complexity of the System, and Method of Evaluation all Effect the perception of Sweetness."* Food Technology, Ed. Neil H. Mermelstein, Nov. 1991, p. 121–126.

Chay, Michele and Laurence Hayert. "Magnitude Estimation Appliquée à L'étude de la Saveur Sucrée de la Saccharine, de l'Aspartame et de l'Acésulfame K dans les Boissons Rafraichissantes sans Alcool." *Bios.* 19(3) Mar. 1998, p. 29–33.

Hyvönen, Lea, et al. "Fructose–Saccharin and Xylitol–Saccharin Synergism." *Journal of Food Science,* 43 (1973) p. 251–254.

Askar, A. and M. El–Zoghbl. "Relative Süβe und Synergismus von Fructose oder Xylit mit Aspartam oder Acesulfam–K."

Leatherhead Food International. *High Potency Sweeteners—All you Need to Know.* LinTech and/or Connect Consulting; Jun. 4–5, 2003, p. 1.1–10.18.

Duxbury, Dean D. "High–Intensity Sweetener Blends Provide Synergistic Enhancement, Worldwide Food Applications of Non–Caloric Acesulfame–K Poised for U.S. Market." *Food Processing,* Apr. 1990, p. 36, 38, 40.

Lawless, Harry and Hildegarde Heymann. Appendix 11 "Nonparametric and Binomial–Based Statistical Methods," In *Sensory Evaluation of Food: Principles and Practices.* Aspen Publishers, Inc.: New York, p. 679–700.

Best, Daniel and Lisa Nelson. "Low–Calorie Foods and Sweeteners." *Prepared Foods* 162(7) Jun. 1993: p. 47. LexisNexis.

"Amorphous solid." *McGraw Hill Concise Encyclopedia of Science & Technology.* Ed. Sybil P. Parker. $3^{rd}$ edition, McGraw–Hill, Inc. 1994 p. 84–85.

Birch, Gordon G. "Modulation of Sweet Taste." *BioFactors* 9 (1999) p. 73–80.

Edwards, C.L. and S.J. Palmer. Perceived Taste Intensity and Duration of Nutritive and Non–Nutritive Sweeteners in Water using Time–Intensity (T–I) Evaluations. *Journal of Food Science.* 56(2) 1991, p. 535–542.

Hulteau, F., et al. "Physicochemical and Psychophysical Characteristics of Binary Mixtures of Bulk and Intense Sweeteners." *Food Chemistry,* 63(1) 1998 p. 9–16.

Pariza, Michael W., et al. "Predicting the Functionality of Direct Food Additives," *Food Technology,* 52(11), Nov. 1998, p. 56–60.

Schiffman, Susan S. "Receptors that Mediate Sweetness: Inferences from Biochemical, Electrophysiological and Psychophysical Data." *Pure and Applied Chemistry,* 89(4), 1997, p. 701–708.

Birch, Gordan G. "Role of Water in Sweet Taste Chemoreception." *Pure Appl. Chem.,* 74(7) 2002, p. 1103–1108.

Kilcast, David. "Satisfying Consumer Demands for Sweetness Quality." *AgroFOOD Industry Hi–tech,* Jul./Aug. 2004, p. 36–38.

Polanski, Jaroslaw, et al. "Self–Organizing Neural Networks for Screening and Development of Novel Artificial Sweetener Candidates." *Combinatorial Chemistry & High Throughput Screening,* 3(6) 2000, p. 481–495.

Schiffman, Susan, et al. "Selective Inhibition of Sweetness by the Sodium Salt of ±–2(4–Methoxyphenoxy)propanoic Acid." *Chem. Senses,* 24 (1999) p. 439–447.

Carr, B. Thomas, et al. Sensory Methods for Sweetener Evaluation. In *Flavor Measurement,* eds. Chi–Tang Ho and Charles H. Manley; Marcel Dekker, Inc.: New York, 1993, p. 219–237.

Haywood, Kieran, ed. *The Optimisation of Sweet Taste Quality Abstracts from the ISOT ECRO 2000 Conference,* Jul. 23, 2000.

O'Carroll, Pat. "Sweetener Trends: Adverse Media Coverage is a Concern." *The World of Food Ingredients,* Feb./Mar. 2000, p. 36–38.

Schiffman, S.S. and C. A. Gatlin. "Sweeteners: State of Knowledge Review." *Neuroscience and Biobehavioral Reviews,* 17 (1993) p. 313–345.

O'Carroll, Pat. "Sweeteners—Synergistic Solutions: Cooperation and Dialogue spur the Development of New Blends and Sweetener Offerings." *The World of Ingredients,* Mar./ Apr. 1998, p. 20–23.

Schiffman, Susan S. "Synergism among Ternary Mixtures of Fourteen Sweeteners." *Chem. Senses,* 25 (2000) p. 131–140.

The University of Reading. *The Mechanistic Understanding of the Sweetness Response AIR3 –CT94 –2107: Final Technical Report.* Jan. 1995–Mar. 1998 p. 1–35.

Lawless, Harry T. "Theoretical Note: Tests of Synergy in Sweetener Mixtures." *Chem. Senses,* 23 (1998) p. 447–451.

Van Dijk, G.J. and M. Rooyakkers. "Sweet Synergy: The Synergy Between Chicory–Based Fructose Syrup and Intensive Sweeteners." *IFI* No. 5 (1996) p. 38–39.

Moskowitz, Howard R. and Leon Klarman. "The Tastes of Artificial Sweeteners and their Mixtures." *Chemical Senses and Flavor* 1(1975) p. 411–412.

Birch, Gordon G. "Towards an Improved Understanding of Sweetener Energy." *Trends in Food Science & Technology* Dec. 1996 vol. 7, p. 403–407.

Machado SG and Robinson GA. An abstract of "A Direct, General Approach Based on Isobolograms for Assessing the Joint Action of Drugs in Pre–Clinical Experiments." *Stat. Med.* Nov. 30, 1994; 13(22); p. 2289–309. PubMED.

Lam GK. An Abstract of "The Differential Aspects of the Linear Isobole in the Study of Combined Action of Agents." *Bull Math Biol.* Mar. 1993; 55(2) p. 295–313. PubMED.

Suhnel J. An abstract of "Zero Interaction Response Surfaces, Interaction Functions and Difference Response Surfaces for Combinations of Biologically Active Agents." *Arzneimittelforschung* Oct. 1992; 42(10) p. 1251–1258. PubMED.

Poch G., et al. An abstract of "Application of the Isobologram Technique for the Analysis of Combined Effects with Respect to Additivity as well as Independence." *Can. J. Physiol. Pharmacol.* Jun. 1990; 68(6) p. 682–688. PubMED.

Lam GK. An abstract of "Analysis of Interaction of Mixtures of Agents Using the Linear Isobole." *Bull Math Biol.* 1989; 51(3) p. 293–309. PubMED.

Affidavit of Harry T. Lawless in Interference No. 105,246 (RES); Nov. 23, 2004.

Deposition Transcript Eric Walters, Interference No. 105, 246; Jan. 25, 2005.

16 CFR 1500.14.

Deposition Transcript Indra Prakash, Interference No. 105, 246; Jan. 26, 2005.

Affidavit of Hirotoshi Ishida; Interference No. 105,246 (RES) Feb. 8, 2005.

Second Affidavit of Harry T. Lawless, Interference No. 105,246 (RES); Feb. 10, 2005.

Deposition of Harry T. Lawless, Interference No. 105,246 (RES); Jan. 11, 2005.

Deposition of D. Eric Walters, Interference No. 105,246 (RES); Mar. 16, 2005.

Deposition of Harry T. Lawless, Interference No. 105,246 (RES); Mar. 9, 2005.

Muller, George W., et al. "Carboxylic Acid Replacement Structure—Activity Relationships in Suosan Type Sweeteners. A Sweet Taste Antagonist." *J. Chem. Med.* 35 (1992) p. 1747–1751.

*Ajinomoto Co., Inc.* v. *NutraSweet Company.* Interference No. 105,246 (RES); Decision on Motions Under 37 CFR § 41.125. Filed Jun. 9, 2006.

DeBois, Grant E., et al. "Mechanism of Human Sweet Taste and Implications for Rational Sweetener Design." In *Flavor Measurement,* eds. Chi–Tang Ho and Charles H. Manley; Marcel Dekker, Inc.: New York, 1993, p. 299–266.

Walters, D. Eric. Chapter 6 "Genetically Evolved Receptor Models (GERM) as a 3D QSAR Tool." *Perspectives in Drug and Design.* 12/13/14: p. 159–166, 1998.

Walters, Eric D. "Interactions between Sweet and Bitter Tastes." In *Modifying Bitterness: Mechanisms, Ingredients, and Applications.,* ed. Glen Roy, Technomic Publishing Company, Inc. 1997; p. 127–137.

Walters, D. Eric. "Homology–Based Model of the Extracellular Domain of the Taste Receptor T1R3." *Pure Appl. Chem* 74(7) 2002, p. 1117–1123.

Walters, D. Eric. "How are Bitter and Sweet Tastes Related?" *Trends in Food Science & Technology,* (7) Dec. 1996, p. 399–403.

Hallinan, E. Ann. "Investigations of (4–Cyanophenyl) Ureas of Sweet Amino Acids as Potential Sweeteners." *J. Agric. Food Chem.,* 39, 1991 p. 1836–1838.

Chinn, Leland J., et al. "Isovanillyl Sweeteners. Amide Analogues of Dihydrochalcones." *J. Agric. Food Chem.,* 35, 1987 p. 409–411.

Muller, Geroge W., et al. "N,N'–Disubstituted Guanidine High–Potency Sweeteners." *Journal of Medical Chemistry* 35, 1992 p. 740–743.

Roczniak, Steven and D. Eric Walters. "Use of the Specificity Constant Rmax/K, for rigorous comparisons of sweetener potencies." *Chemical Senses* 16(5) 1991, p. 491–495.

O'Brien, Dennis. "Sweet on Sugar Substitute; Alternatives: With Millions Dieting, whoever Finds an Artificial Sweetener with the Taste and Versatility of Sugar is Sure to "Win Big"." *The Baltimore Sun* Jan. 26, 2004; Telegraph, p. 8A. LexisNexis.

Culberson & Walters. "3–D Model for the Sweet Taste Receptor." In *Sweeteners: Discovery, Molecular Design, and Chemoreception,* eds. D. Eric Walters, et al. American Chemical Society 1991, p. 215–223.

Muller, George W., et al. "High–Potency Sweeteners Derived from β–Amino Acids." In *Sweeteners: Discovery, Molecular Design, and Chemoreception,* eds. D. Eric Walters, et al. American Chemical Society 1991, p. 113–125.

Hellekant, Göran, et al. "Electrophysiological Evaluation of Sweeteners." In *Sweeteners: Discovery, Molecular Design, and Chemoreception,* eds. D. Eric Walters, et al. American Chemical Society 1991, p. 290–300.

Walters, D. Eric. "The Rational Discovery of Sweeteners." In *Sweeteners: Discovery, Molecular Design, and Chemoreception,* eds. D. Eric Walters, et al. American Chemical Society 1991, p. 1–11.

Hellekant, Göran and Eric D. Walters. "An Example of Phylogenic Differences in Sweet Taste: Sweetness of Five High–Potency Sweeteners in Rats." In *Sweet–Taste Chemoreception* eds. Mohamed Mathlouth, et al., Elsevier Science Publishers, Ltd.: London 1993, p. 373–386.

DuBois, Grant E., et al. "The Rational Design of Ultra–High–Potency Sweeteners." In *Sweet–Taste Chemoreception* eds. Mohamed Mathlouth, et al., Elsevier Science Publishers, Ltd.: London 1993, p. 237–267.

Walters, Eric D. and Glenn Roy. "Taste Interactions of Sweet and Bitter Compounds." *Flavor–Food Interactions: Developed from a Symposium Sponsored by the Division of Agricultural and Food Chemistry at the 208th National Meeting of the American Chemical Society,* American Chemical Society: Washington, DC, Aug. 21–25, 1994, (1996) p. 130–142.

Ager, David J., et al. "The Synthesis of the High–Potency Sweetener, NC–00637. Part 1: The Synthesis of (S)–2–Methylhexanoic Acid." *Organic Process Research and Development,* 7(3) 2003 p. 369–378.

Ager, David J., et al. "The Synthesis of the High–Potency Sweetener, NC–00637. Part 3: The Glutamyl Moiety and Coupling Reactions." *Organic Process Research and Development,* 8(1) 2004 p. 72–85.

Ager, David J., et al. "The Synthesis of the High–Potency Sweetener, NC–00637. Part 2: Preparation of the Pyridine Moiety." *Organic Process Research and Development,* 8(1) 2004 p. 62–71.

Walters, D. Eric. "Using Models to Understand and Design Sweeteners." *Journal of Chemical Education,* 72(8) Aug. 1995 p. 680–682.

Webb, Ginger. "Licorice Extract and Glycyrrhizin Activity." *The Journal of the American Botanical Council,* issue 39, 1997 p. 21.

Beidler, Lloyd M. "Taste Receptor Stimulation." *Progr. Biophysics and Biophysic. Chem.* 12, 1962 p. 109–151.

Declaration of Indra Prakash. Interference No. 105,246 (RES), Nov. 24, 2004.

Declaration of Eric D. Walters. Interference No. 105,246 (RES), Nov. 24, 2004.

Second declaration of Eric D. Walters. Interference No. 105,246 (RES), Feb. 10, 2005.

Letter to Gibes, Keron and Laurie Pajor from Jeff Hoster. Invention Disclosure of "Sweetness Synergy in Binary Blends of Neotame and other Sweeteners," Oct. 12, 1998.

Home, John, et al. "Bitter Taste of Saccharin and Acesulfame–K." *Chem. Senses* 27 (2002) p. 31–38.

Deposition of Hirotoshi Ishida. Interference No. 105,246 (RES), Apr. 3, 2005.

*Ajinomoto Co., Inc.* v. *NutraSweet Company.* Interference No. 105,246 (RES); Ajinomoto's Misc. Motion No. 1, Sep. 24, 2004.

*Ajinomoto Co., Inc.* v. *NutraSweet Company.* Interference No. 105,246 (RES); Ajinomoto's Misc. Motion No. 11, Jan. 3, 2005.

*Ajinomoto Co., Inc.* v. *NutraSweet Company.* Interference No. 105,246 (RES); Ajinomoto's Misc. Motion No. 2, Oct. 26, 2004.

*Ajinomoto Co., Inc.* v. *NutraSweet Company.* Interference No. 105,246 (RES); Ajinomoto's Preliminary Motion No. 10, Nov. 24, 2004.

*Ajinomoto Co., Inc.* v. *NutraSweet Company.* Interference No. 105,246 (RES); Ajinomoto's Preliminary Motion No. 3, with appendix A, B, C, and D. Nov. 24, 2004.

*Ajinomoto Co., Inc.* v. *NutraSweet Company.* Interference No. 105,246 (RES); Ajinomoto's Preliminary Motion No. 4, Nov. 24, 2004.

*Ajinomoto Co., Inc.* v. *NutraSweet Company.* Interference No. 105,246 (RES); Ajinomoto's Preliminary Motion No. 5, Nov. 24, 2004.

*Ajinomoto Co., Inc.* v. *NutraSweet Company.* Interference No. 105,246 (RES); Ajinomoto's Preliminary Motion No. 6, Nov. 24, 2004.

*Ajinomoto Co., Inc.* v. *NutraSweet Company.* Interference No. 105,246 (RES); Ajinomoto's Preliminary Motion No. 7, Nov. 24, 2004.

*Ajinomoto Co., Inc.* v. *NutraSweet Company.* Interference No. 105,246 (RES); Ajinomoto's Preliminary Motion No. 8, Nov. 24, 2004.

*Ajinomoto Co., Inc.* v. *NutraSweet Company.* Interference No. 105,246 (RES); Ajinomoto's Preliminary Motion No. 9, with appendix A, B, and C. Nov. 24, 2004.

*Ajinomoto Co., Inc.* v. *NutraSweet Company.* Interference No. 105,246 (RES); Request for Oral Argument for Ajinomoto Motions No. 1–10 and 12, Nov. 17, 2004.

*Ajinomoto Co., Inc.* v. *NutraSweet Company.* Interference No. 105,246 (RES); Ajinomoto's Second Supplemental Notice of Preliminary Motions, Nov. 17, 2004.

*Ajinomoto Co., Inc.* v. *NutraSweet Company.* Interference No. 105,246 (RES); Ajinomoto's Motion No. 12 to Suppress, Apr. 20, 2005.

*Ajinomoto Co., Inc.* v. *NutraSweet Company.* Interference No. 105,246 (RES); Ajinomoto's Reply No. 1, Oct. 18, 2004.

*Ajinomoto Co., Inc.* v. *NutraSweet Company.* Interference No. 105,246 (RES); Ajinomoto's Reply No. 10, Mar. 30, 2005.

*Ajinomoto Co., Inc.* v. *NutraSweet Company.* Interference No. 105,246 (RES); Ajinomoto's Reply No. 2, Nov. 1, 2004.

*Ajinomoto Co., Inc.* v. *NutraSweet Company.* Interference No. 105,246 (RES); Ajinomoto's Reply No. 3 to Ajinomoto's Preliminary Motion No. 3, Mar. 23, 2005.

*Ajinomoto Co., Inc.* v. *NutraSweet Company.* Interference No. 105,246 (RES); Ajinomoto's Reply No. 4, Mar. 30, 2005.

*Ajinomoto Co., Inc.* v. *NutraSweet Company.* Interference No. 105,246 (RES); Ajinomoto's Reply No. 5, Mar. 30, 2005.

*Ajinomoto Co., Inc.* v. *NutraSweet Company.* Interference No. 105,246 (RES); Ajinomoto's Reply No. 6, Mar. 30, 2005.

*Ajinomoto Co., Inc.* v. *NutraSweet Company.* Interference No. 105,246 (RES); Ajinomoto's Reply No. 7, Mar. 30, 2005.

*Ajinomoto Co., Inc.* v. *NutraSweet Company.* Interference No. 105,246 (RES); Ajinomoto's Reply No. 8, Mar. 30, 2005.

*Ajinomoto Co., Inc.* v. *NutraSweet Company.* Interference No. 105,246 (RES); Ajinomoto's Reply No. 9, Mar. 30, 2005.

*Ajinomoto Co., Inc.* v. *NutraSweet Company.* Interference No. 105,246 (RES); Supplementation of Evidence in Response to Nutrasweet's Objection to Exhibits 2002–2004; Oct. 20, 2004.

*Ajinomoto Co., Inc.* v. *NutraSweet Company.* Interference No. 105,246 (RES); Ajinomoto's Reply No. 12, May 25, 2005.

*Ajinomoto Co., Inc.* v. *NutraSweet Company.* Interference No. 105,246 (RES); Nutrasweet Misc. Motion 1, Sep. 21, 2004.

*Ajinomoto Co., Inc.* v. *NutraSweet Company.* Interference No. 105,246 (RES); Nutrasweet Unopposed Misc. Motion 2, Apr. 13, 2005.

*Ajinomoto Co., Inc.* v. *NutraSweet Company.* Interference No. 105,246 (RES); Nutrasweet Misc. Motion 2, Nov. 24, 2004.

*Ajinomoto Co., Inc.* v. *NutraSweet Company.* Interference No. 105,246 (RES); Nutrasweet Preliminary Motion 2, Nov. 24, 2004.

*Ajinomoto Co., Inc.* v. *NutraSweet Company.* Interference No. 105,246 (RES); Nutrasweet Preliminary Motion 3, Nov. 24, 2004.

*Ajinomoto Co., Inc.* v. *NutraSweet Company.* Interference No. 105,246 (RES); Nutrasweet Preliminary Motion 4, Nov. 24, 2004.

*Ajinomoto Co., Inc.* v. *NutraSweet Company.* Interference No. 105,246 (RES); Nutrasweet Preliminary Motion 5, Nov. 24, 2004.

*Ajinomoto Co., Inc.* v. *NutraSweet Company.* Interference No. 105,246 (RES); Nutrasweet Preliminary Motion 6, Nov. 24, 2004.

*Ajinomoto Co., Inc.* v. *NutraSweet Company.* Interference No. 105,246 (RES); Nutrasweet Preliminary Motion 7, Nov. 24, 2004.

*Ajinomoto Co., Inc.* v. *NutraSweet Company.* Interference No. 105,246 (RES); Nutrasweet Provisional Preliminary Motion 8, Nov. 24, 2004.

*Ajinomoto Co., Inc.* v. *NutraSweet Company.* Interference No. 105,246 (RES); Nutrasweet's Motion to Exclude or Suppress Evdience No. 10, Apr. 20, 2005.

*Ajinomoto Co., Inc.* v. *NutraSweet Company.* Interference No. 105,246 (RES); Nutrasweet's Request for Oral Argument, Apr. 20, 2005.

*Ajinomoto Co., Inc.* v. *NutraSweet Company.* Interference No. 105,246 (RES); Nutrasweet Opposition No. 1, Oct. 12, 2004.

*Ajinomoto Co., Inc.* v. *NutraSweet Company.* Interference No. 105,246 (RES); Nutrasweet Opposition No. 2, Oct. 27, 2004.

*Ajinomoto Co., Inc.* v. *NutraSweet Company.* Interference No. 105,246 (RES); Nutrasweet Opposition No. 3, Feb. 24, 2005.

*Ajinomoto Co., Inc.* v. *NutraSweet Company.* Interference No. 105,246 (RES); Nutrasweet Opposition No. 4, Feb. 11, 2005.

*Ajinomoto Co., Inc.* v. *NutraSweet Company.* Interference No. 105,246 (RES); Nutrasweet Opposition No. 5, Feb. 11, 2005.

*Ajinomoto Co., Inc.* v. *NutraSweet Company.* Interference No. 105,246 (RES); Nutrasweet Opposition No. 6, Feb. 11, 2005.

*Ajinomoto Co., Inc.* v. *NutraSweet Company.* Interference No. 105,246 (RES); Nutrasweet Opposition No. 7, Feb. 11, 2005.

*Ajinomoto Co., Inc.* v. *NutraSweet Company.* Interference No. 105,246 (RES); Nutrasweet Opposition No. 8, Feb. 11, 2005.

*Ajinomoto Co., Inc.* v. *NutraSweet Company.* Interference No. 105,246 (RES); Nutrasweet Opposition No. 9, Feb. 11, 2005.

*Ajinomoto Co., Inc.* v. *NutraSweet Company.* Interference No. 105,246 (RES); Nutrasweet Opposition No. 10, Feb. 11, 2005.

*Ajinomoto Co., Inc.* v. *NutraSweet Company.* Interference No. 105,246 (RES); Nutrasweet Opposition No. 12, May 11, 2005.

*Ajinomoto Co., Inc.* v. *NutraSweet Company.* Interference No. 105,246 (RES); Ajinomoto's Corrected Clean Copy of Claims, Aug. 12, 2004.

*Ajinomoto Co., Inc.* v. *NutraSweet Company.* Interference No. 105,246 (RES); Ajinomoto's Notice Regarding Annotated Claims, Aug. 12, 2004.

*Ajinomoto Co., Inc.* v. *NutraSweet Company.* Interference No. 105,246 (RES); Nutrasweet's Designation of Lead and Backup Counsel, Aug. 13, 2004.

*Ajinomoto Co., Inc.* v. *NutraSweet Company.* Interference No. 105,246 (RES); Nutrasweet's exhibit list, Apr. 13, 2005.

*Ajinomoto Co., Inc.* v. *NutraSweet Company.* Interference No. 105,246 (RES); Nutrasweet's Clean Copy of Claims, Aug. 13, 2005.

*Ajinomoto Co., Inc.* v. *NutraSweet Company.* Interference No. 105,246 (RES); Nutrasweet's Notice of Real Party of Interest, Aug. 13, 2004.

*Ajinomoto Co., Inc.* v. *NutraSweet Company.* Interference No. 105,246 (RES); Nutrasweet's Request for File Copies, Aug. 13, 2004.

Labuza, Theodore P. and Wendy M. Baisier. "The Kinetics of Nonenzymatic Browning." In *Physical Chemistry of Foods,* New York, NY: Marcel Dekker; p. 595–649, 1992.

*Ajinomoto Co., Inc.* v. *NutraSweet Company.* Interference No. 105,246 (RES); Nutrasweet Notice of Filing Priority Statement, Nov. 24, 2004.

*Ajinomoto Co., Inc.* v. *NutraSweet Company.* Interference No. 105,246 (RES); Nutrasweet's List of Preliminary Motions, Aug. 13, 2004.

*Ajinomoto Co., Inc.* v. *NutraSweet Company.* Interference No. 105,246 (RES); Nutrasweet's Notice of Non–Receipt of File Copy, Aug. 13, 2004.

*Ajinomoto Co., Inc.* v. *NutraSweet Company.* Interference No. 105,246 (RES); Nutrasweet's Notice of Serving Additional Literature on Ajinomoto, Nov. 16, 2004.

*Ajinomoto Co., Inc.* v. *NutraSweet Company.* Interference No. 105,246 (RES); Nutrasweet Misc. Motion 1 Reply.

*Ajinomoto Co., Inc.* v. *NutraSweet Company.* Interference No. 105,246 (RES); Nutrasweet's Reply No. 2, Apr. 13, 2005.

*Ajinomoto Co., Inc.* v. *NutraSweet Company.* Interference No. 105,246 (RES); Nutrasweet's Reply No. 3, Apr. 13, 2005.

*Ajinomoto Co., Inc.* v. *NutraSweet Company.* Interference No. 105,246 (RES); Nutrasweet's Reply No. 4, Apr. 13, 2005.

*Ajinomoto Co., Inc.* v. *NutraSweet Company.* Interference No. 105,246 (RES) Errata for Nutrasweet's Reply No. 4, May 25, 2005.

*Ajinomoto Co., Inc.* v. *NutraSweet Company.* Interference No. 105,246 (RES); Nutrasweet's Reply No. 5, Apr. 13, 2005.

*Ajinomoto Co., Inc.* v. *NutraSweet Company.* Interference No. 105,246 (RES); Errata for Nutrasweet's Reply No. 5, May 25, 2005.

*Ajinomoto Co., Inc.* v. *NutraSweet Company.* Interference No. 105,246 (RES); Nutrasweet's Reply No. 6, Apr. 13, 2005.

*Ajinomoto Co., Inc.* v. *NutraSweet Company.* Interference No. 105,246 (RES); Nutrasweet's Reply No. 7, Apr. 13, 2005.

*Ajinomoto Co., Inc.* v. *NutraSweet Company.* Interference No. 105,246 (RES); Nutrasweet's Reply No. 8 to Ajinomoto's Opposition No. 8 to Nutrasweet's Provisional Preliminay Motion No. 8, Mar. 30, 2005.

*Ajinomoto Co., Inc.* v. *NutraSweet Company.* Interference No. 105,246 (RES); Nutrasweet's Reply No. 10, May 25, 2005.

*Ajinomoto Co., Inc.* v. *NutraSweet Company.* Interference No. 105,246 (RES); Nutrasweet's Responses to Ajinomoto's Observations, May 11, 2005.

*Ajinomoto Co., Inc.* v. *NutraSweet Company.* Interference No. 105,246 (RES); Ajinomoto's Objections to Nutrasweet's Exhibits, Dec. 2, 2004.

*Ajinomoto Co., Inc.* v. *NutraSweet Company.* Interference No. 105,246 (RES); Ajinomoto's Objections to Nutrasweet's Exhibits to Nutrasweet Opposition Nos. 4–9, Feb. 18, 2005.

*Ajinomoto Co., Inc.* v. *NutraSweet Company.* Interference No. 105,246 (RES); Ajinomoto's Objections to Nutrasweet's Exhibits to Nutrasweet Replies Nos. 2–7, Apr. 20, 2005.

*Ajinomoto Co., Inc.* v. *NutraSweet Company.* Interference No. 105,246 (RES); Ajinomoto's Opposition No. 1, Oct. 12, 2004.

*Ajinomoto Co., Inc.* v. *NutraSweet Company.* Interference No. 105,246 (RES); Ajinomoto's Opposition No. 2 to Nutrasweet's Preliminary Motion No. 2, Alleging Obviousness of Ajinomoto's Claims, Feb. 11, 2005.

*Ajinomoto Co., Inc.* v. *NutraSweet Company.* Interference No. 105,246 (RES); Ajinomoto's Opposition No. 3 to Nutrasweet Preliminary Motion No. 3, Feb. 11, 2005.

*Ajinomoto Co., Inc.* v. *NutraSweet Company.* Interference No. 105,246 (RES); Ajinomoto's Opposition No. 4 to Nutrasweet Preliminary Motion No. 4, Feb. 11, 2005.

*Ajinomoto Co., Inc.* v. *NutraSweet Company.* Interference No. 105,246 (RES); Ajinomoto's Opposition No. 5 to Nutrasweet Preliminary Motion No. 5, Feb. 11, 2005.

*Ajinomoto Co., Inc.* v. *NutraSweet Company.* Interference No. 105,246 (RES); Ajinomoto's Opposition No. 6 to Nutrasweet's Preliminary Motion No. 6 for Judgment that Ajinomoto Claims 15–39 are Unpatentable under 35 USC §112, ¶ 2, Feb. 11, 2005.

*Ajinomoto Co., Inc.* v. *NutraSweet Company.* Interference No. 105,246 (RES); Ajinomoto's Opposition No. 7 to Nutrasweet's Preliminary Motion No. 7 for Judgment that Ajinomoto Claims 15–39 are Unpatentable under 35 USC §112, ¶ 1, Feb. 11, 2005.

*Ajinomoto Co., Inc.* v. *NutraSweet Company.* Interference No. 105,246 (RES); Ajinomoto's Opposition No. 8 to Nutrasweet's Preliminary Motion No. 8 for Judgment that Ajinomoto Claim 40 is invalid under 35 USC §135(b), Feb. 11, 2005.

*Ajinomoto Co., Inc.* v. *NutraSweet Company.* Interference No. 105,246 (RES); Ajinomoto's Opposition No. 10 to Nutrasweet's Motion to Exclude or Suppress, May 11, 2005.

*Erstellung eines Compartmentmodells des Süßrezeptors zur Vorhersage der Süßintensität beliebiger Mischungen ausgewählter süßer Verbindungen in wässriger Lösung.* Sep. 9, 2001.

*Ajinomoto Co., Inc.* v. *NutraSweet Company.* Interference No. 105,246 (RES); Judgment Under 37 CFR §41.127. Filed Jun. 9, 2006.

*Ajinomoto Co., Inc.* v. *NutraSweet Company.* Interference No. 105,246 (RES); Decision on Motions Under 37 CFR § 41.125. Filed Jun. 9, 2006.

Schiffman et al. "Investigation of Synergism in Binary Mixtures of Sweeteners" *Brain Research Bulletin* (1995) vol. 38, pp. 105–120.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–17 are cancelled.

* * * * *